(12) United States Patent
Yamaguchi et al.

(10) Patent No.: US 11,746,983 B2
(45) Date of Patent: Sep. 5, 2023

(54) VEHICLE SIGNAL LIGHT

(71) Applicant: STANLEY ELECTRIC CO., LTD., Tokyo (JP)

(72) Inventors: Ayumi Yamaguchi, Tokyo (JP); Naoya Iwasaki, Tokyo (JP); Takahiro Watanabe, Tokyo (JP); Daisaku Yamaguchi, Tokyo (JP); Yasushi Kita, Tokyo (JP); Takako Kimura, Tokyo (JP); Wataru Nakashima, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/749,797

(22) Filed: May 20, 2022

(65) Prior Publication Data

US 2022/0373153 A1     Nov. 24, 2022

(30) Foreign Application Priority Data

May 24, 2021   (JP) ................................ 2021-087251

(51) Int. Cl.
| | |
|---|---|
| *F21S 43/14* | (2018.01) |
| *F21S 43/249* | (2018.01) |
| *F21S 43/20* | (2018.01) |
| *F21S 43/30* | (2018.01) |
| *F21W 103/35* | (2018.01) |
| *F21W 103/20* | (2018.01) |

(52) U.S. Cl.
CPC ............. *F21S 43/14* (2018.01); *F21S 43/249* (2018.01); *F21S 43/26* (2018.01); *F21S 43/30* (2018.01); *F21W 2103/20* (2018.01); *F21W 2103/35* (2018.01)

(58) Field of Classification Search
CPC ..................................... F21S 43/249
See application file for complete search history.

(56) References Cited

U.S. PATENT DOCUMENTS

| | | | |
|---|---|---|---|
| 9,599,308 B2 * | 3/2017 | Ender | F21S 43/239 |
| 2003/0156425 A1 * | 8/2003 | Turnbull | B63B 45/00 |
| | | | 362/800 |
| 2012/0299476 A1 * | 11/2012 | Roberts | B60Q 1/2607 |
| | | | 315/77 |
| 2021/0190287 A1 * | 6/2021 | Lach | F21S 43/14 |

FOREIGN PATENT DOCUMENTS

JP        H05-031003 U    4/1993

* cited by examiner

*Primary Examiner* — Eric T Eide
(74) *Attorney, Agent, or Firm* — Kenealy Vaidya LLP

(57) ABSTRACT

Provided is a vehicle signal light in which a person with protanopia (p-type color vision deficiency) can perceive whether or not the vehicle signal light, e.g., a stop lamp, a tail lamp, or the like, is turned on. The vehicle signal light includes a first light source configured to emit red light and a second light source configured to emit amber light. The first light source and the second light source are simultaneously turned on and are configured to emit light with a higher luminous intensity in response to a braking operation, and the emission intensity of the first light source is higher than that of the second light source.

14 Claims, 10 Drawing Sheets

VEHICLE SIGNAL LIGHT

This application claims the priority benefit under 35 U.S.C. § 119 of Japanese Patent Application No. 2021-087251 filed on May 24, 2021, which is hereby incorporated in its entirety by reference.

TECHNICAL FIELD

The presently disclosed subject matter relates to a vehicle signal light, and more particularly, to a vehicle signal light in which a person with protanopia (a person with p-type color vision deficiency) can perceive whether or not the vehicle signal light, e.g., a stop lamp, a tail lamp, or the like, is turned on.

BACKGROUND ART

There is currently known a vehicle signal light including a first light source configured to emit red light in a first wavelength band (not less than 620 nm) and a second light source configured to emit red light in a second wavelength band (less than 620 nm), wherein the first light source and the second light source are simultaneously turned on to emit light with a higher luminous intensity in response to a braking operation (for example, see Japanese Utility Model Application Laid-Open No. Hei. 5-031003).

In general, the luminosity factor of a person with protanopia in regards to red light is lower than that of a person with normal color vision. Therefore, it is difficult for a person with protanopia to perceive red light, and there occurs a problem in which such a person has difficulties in perceiving whether or not the vehicle signal light, e.g., a stop lamp, a tail lamp or the like is turned on.

SUMMARY

The presently disclosed subject matter was devised in view of these and other problems and features in association with the conventional art. It is an object thereof to provide a vehicle signal light capable of allowing a person with protanopia (p-type color vision deficiency) to perceive whether or not the vehicle signal light, e.g., a stop lamp, a tail lamp, or the like, is turned on.

According to an aspect of the presently disclosed subject matter, a vehicle signal light includes a first light source configured to emit red light and a second light source configured to emit amber light, wherein the first light source and the second light source are simultaneously turned on and are configured to emit light with a higher luminous intensity in response to a braking operation, and the emission intensity of the first light source is higher than the emission intensity of the second light source.

With this configuration, a person with protanopia can perceive whether or not the vehicle signal light, e.g., a stop lamp, a tail lamp, or the like is turned on.

This is because the second light source provided is configured to emit amber light, of which the luminosity factor of a person with protanopia is high (higher than that of red light).

The vehicle signal light with the above-mentioned configuration may further include a light emitting unit configured to emit light via transmission of light obtained through mixing of the red light and the amber light, and an optical component configured to control the red light and the amber light so that the light obtained through mixing of the red light and the amber light is transmitted through the light emitting unit.

In the vehicle signal light with the above-mentioned configuration, the ratio of integrated intensity of the red light to that of the amber light after transmission through the light emitting unit may be adjusted so that the chromaticity range of the light obtained through mixing of the red light and the amber light is defined as $x>0.71$ and $y<0.289$.

In this vehicle signal light, it is possible to provide a vehicle signal light in which a person with normal color vision can perceive red color and a person with protanopia can perceive whether or not the vehicle signal light, e.g., a stop lamp, a tail lamp, or the like is turned on.

Adjustment of the ratio of integrated intensity of the red light to that of the amber light after transmission through the light emitting unit so that the chromaticity range of the light obtained through mixing of the red light and the amber light is defined as $x>0.71$ and $y<0.289$ can allow a person with normal color vision to perceive red color.

The provision of the second light source which is configured to emit amber light, of which luminosity factor of a person with protanopia is high (higher than that of red light), can allow a person with protanopia to perceive whether or not the vehicle signal light, e.g., a stop lamp, a tail lamp, or the like is turned on.

In the vehicle signal light with the above-mentioned configuration, the amber light may include light with a peak wavelength of 600 nm or shorter.

In the vehicle signal light with the above-mentioned configuration, the red light may include light with a wavelength of 620 nm or longer, the amber light may not include light with a wavelength of 620 nm or longer, and the ratio of the integrated intensity after transmission through the light emitting unit may be red:amber=100:2.7 to 4.0.

In the vehicle signal light with the above-mentioned configuration, at least one of the first light source and the second light source may be a light-emitting diode (LED).

In the vehicle signal light with the above-mentioned configuration, at least one of the first light source and the second light source may be an organic electroluminescent element (organic EL element).

In the vehicle signal light with the above-mentioned configuration, the optical component may be one selected from a light guide rod and a light guide plate.

In the vehicle signal light with the above-mentioned configuration, the optical component may be a reflector.

In the vehicle signal light with the above-mentioned configuration, the optical component may be a convex lens.

According to the presently disclosed subject matter, it is possible to provide a vehicle signal light with which a person with protanopia (p-type color vision deficiency) can perceive whether or not the vehicle signal light, e.g., a stop lamp, a tail lamp, or the like, is turned on.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
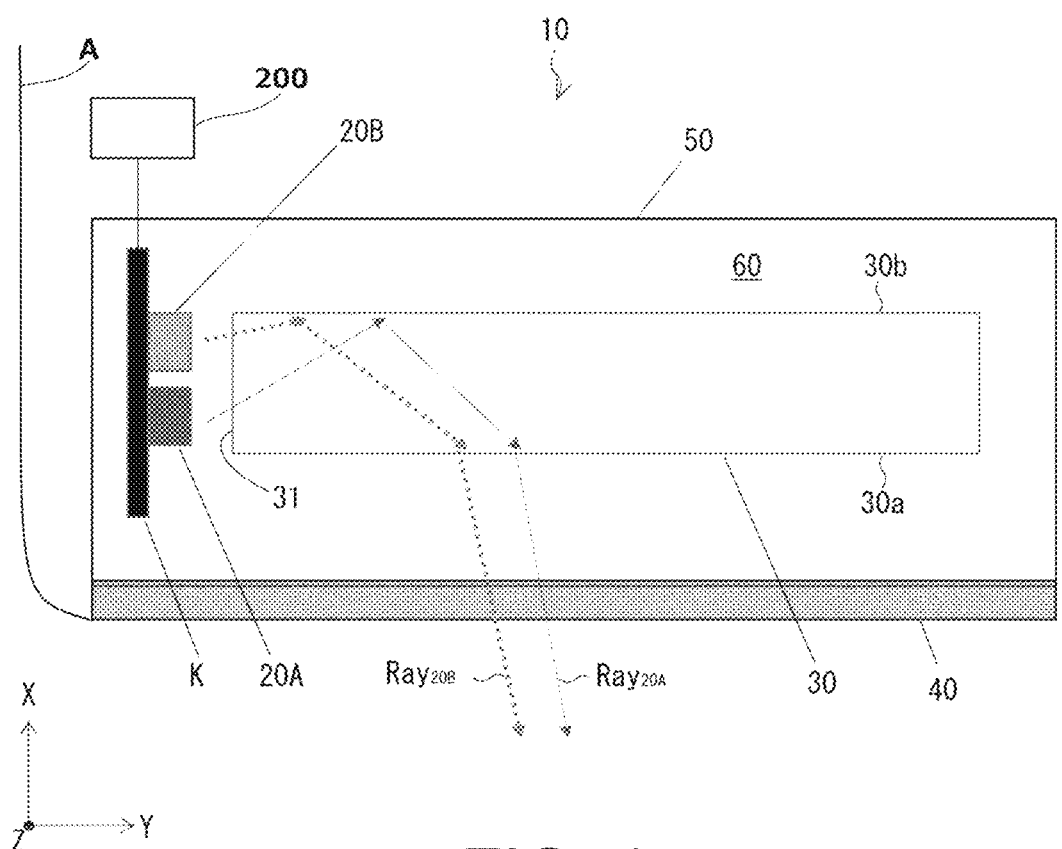
FIG. 1 is a top view of a vehicle signal light 10 included in a vehicle body A made in accordance with principles of the presently disclosed subject matter.

A description will now be given below of a vehicle signal light 10 according to the presently disclosed subject matter with reference to the accompanying drawings in accordance with exemplary embodiments. Components corresponding to one another in the drawings are denoted by the same reference numerals, and repetitive descriptions thereof will be omitted.

The vehicle signal light 10 of the present embodiment functions as a stop lamp and a tail lamp. The vehicle signal light 10 can be mounted on both left and right sides of a rear end portion of a vehicle such as an automobile (not illustrated).

FIG. 1 is a top view of the vehicle signal light 10 included in a vehicle A.

As illustrated in FIG. 1, the vehicle A includes the vehicle signal light 10 and a braking mechanism 200. The vehicle signal light 10 includes a first light source 20A, a second light source 20B, an optical component 30, and the like. The vehicle signal light 10 is disposed in a lamp chamber 60 constituted by an outer lens 40 and a housing 50 and is fixed to the housing 50 or the like. The braking mechanism 200 is connected to the first light source 20A and the second light source 20B to control these light sources 20A and 20B according to the braking effect achieved by the braking operation. Hereinafter, for convenience of description, XYZ axes will be defined as illustrated in FIG. 1 and the like, specifically, the X axis extends in the longitudinal direction of a vehicle body, the Y axis extends in a vehicle width direction, and the Z axis extends in a vertical direction.

Figure 2:
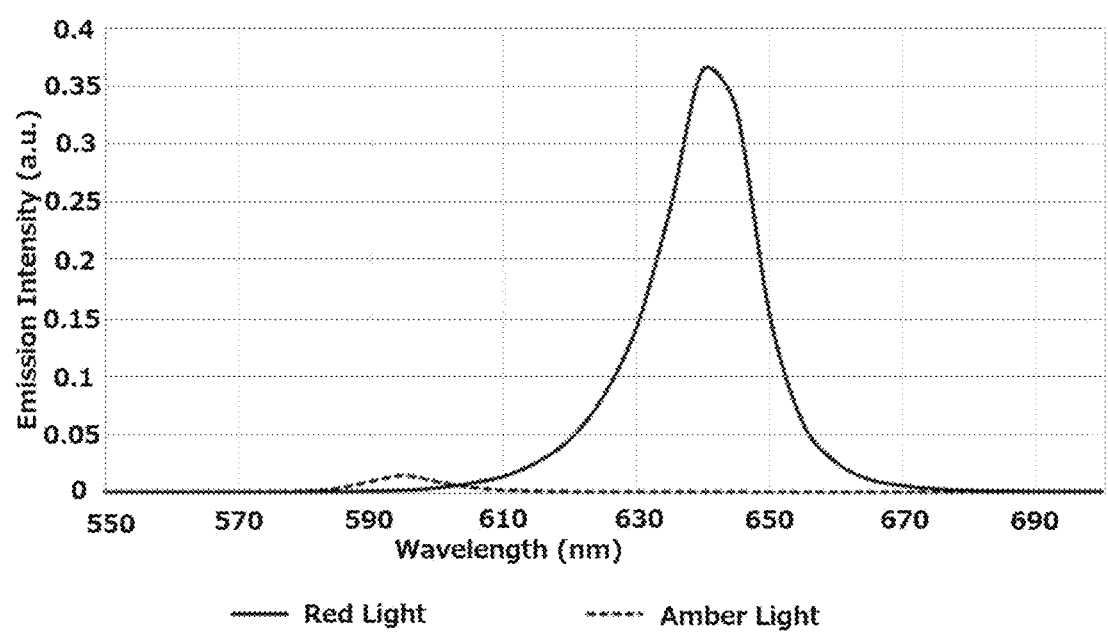
FIG. 2 is an exemplary emission spectrum of a first light source 20A and a second light source 20B of the vehicle signal light 10.

FIG. 2 is an exemplary emission spectrum of the first light source 20A and the second light source 20B. The solid line shows the emission spectrum of red light with a longer wavelength of 620 nm or longer, and the broken line shows the emission spectrum of amber light with a wavelength peak equal to or shorter than 600 nm.

The first light source 20A is configured to emit red light, and for example, is composed of a light-emitting diode (LED). As illustrated in FIG. 2, the red light emitted by the first light source 20A includes light with wavelengths of 620 nm or longer.

The second light source 20B is configured to emit amber light, and for example, is composed of an LED. As illustrated in FIG. 2, the amber light emitted by the second light source 20B has a peak wavelength of 600 nm or shorter, and does not include light with wavelengths of 620 nm or longer. In other words, it is preferable that the amber light emitted by the second light source 20B does not include red light.

The optical component 30 is configured to control the red light emitted by the first light source 20A and the amber light emitted by the second light source 20B so as to allow the mixed light of the red light emitted by the first light source 20A and the amber light emitted by the second light source 20B (mixed color light) to be transmitted through the outer lens 40.

As an example of the optical component 30, a light guide plate will be described and be referred to as a light guide plate 30.

As illustrated in FIG. 1, the light guide plate 30 is made of a transparent resin such as an acrylic resin or a polycarbonate resin. The light guide plate 30 includes a first principal surface 30a and a second principal surface 30b which are opposite to each other. The first light source 20A and the second light source 20B are disposed so as to be opposite to an end face 31 of the light guide plate 30. Hereinafter, the end face 31 is referred to as a light incident surface 31. The first principal surface 30a is directed toward the light irradiation direction, e.g., in a rear direction of the vehicle body. The second principal surface 30b includes a plurality of optical elements, e.g., a plurality of V-grooves extending in the Z direction, configured to diffuse and reflect light incident thereon so as to exit through the first principal surface 30a. The red light emitted by the first light source 20A and the amber light emitted by the second light source 20B are incident on the light incident surface 31 so as to enter the light guide plate 30. Then, they are guided through the light guide plate 30, diffused and reflected by the second principal surface 30b with the plurality of optical elements, so that the red light and the amber light exit from the light guide plate 30 through the first principal surface 30a as mixed light. The light obtained through mixing of the red light and the amber light is transmitted through the outer lens 40 so as to be projected toward the back. At this time, the outer lens 40 emits mixed light of the red light and the amber light having been transmitted through the outer lens 40 (the same surface emission).

The outer lens 40 is made of a transparent resin such as an acrylic resin or a polycarbonate resin. The outer lens 40 is an example of the light emitting unit according to the presently disclosed subject matter.

A ratio of integrated intensity of the red light to that of the amber light after transmission through the outer lens 40 (hereinafter, simply referred to as a ratio of the red light to the amber light) is adjusted (set) so that the chromaticity range of the light obtained through mixing of the red light and the amber light is defined as x>0.71 and y<0.289 so that a person with normal color vision can perceive red color. For example, the ratio of the red light to the amber light may be adjusted (set) so that red:amber light=100:2.7 to 4.0.

The ratio of the red light to the amber light can be calculated using the following formulas 1 to 6.

First, in the XYZ color space defined as CIE 1931, the xy chromaticity coordinates (x, y) are defined as the following formulas 1 and 2.

$$x=X/(X+Y+Z) \quad \text{Formula 1}$$

$$y=Y/(X+Y+Z) \quad \text{Formula 2}$$

Here, the values X, Y, and Z can be obtained by the following formulas 3 to 5.

$$X=\int S(\lambda)\bar{x}(\lambda)d\lambda \quad \text{Formula 3}$$

$$Y=\int S(\lambda)\bar{y}(\lambda)d\lambda \quad \text{Formula 4}$$

$$Z=\int S(\lambda)\bar{z}(\lambda)d\lambda \quad \text{Formula 5}$$

Here, $S(\lambda)$ is obtained by the following formula 6.

$$S(\lambda)=S_R(\lambda)+S_{Am}(\lambda) \quad \text{Formula 6}$$

In these formulas, $S_R(\lambda)$ is the spectrum of the red light emitted by the first light source 20A, and $S_{Am}(\lambda)$ is the spectrum of the amber light emitted by the second light source 20B. The following signs in the formulas 3 to 5 above are color matching functions.

$$\bar{x}(\lambda), \bar{y}(\lambda), \bar{z}(\lambda)$$

Using the above-described formulas 1 to 6, the ratio of the red light to the amber light (the ratio of $S_R(\lambda)$ to $S_{Am}(\lambda)$) that satisfies the color range x>0.71 and y<0.289 necessary for a person with normal color vision to perceive red color, for example, a ratio of red:amber=100:2.7 to 4.0 can be determined.

A description will now be given of the effect of having the first light source 20A and the second light source 20B turned on (continuously turned on) simultaneously so that the ratio of the red light to the amber light adopts the value of the above-mentioned ratio, e.g., red:amber=100:2.7 to 4.0 by comparison with the comparative example.

Figure 3:
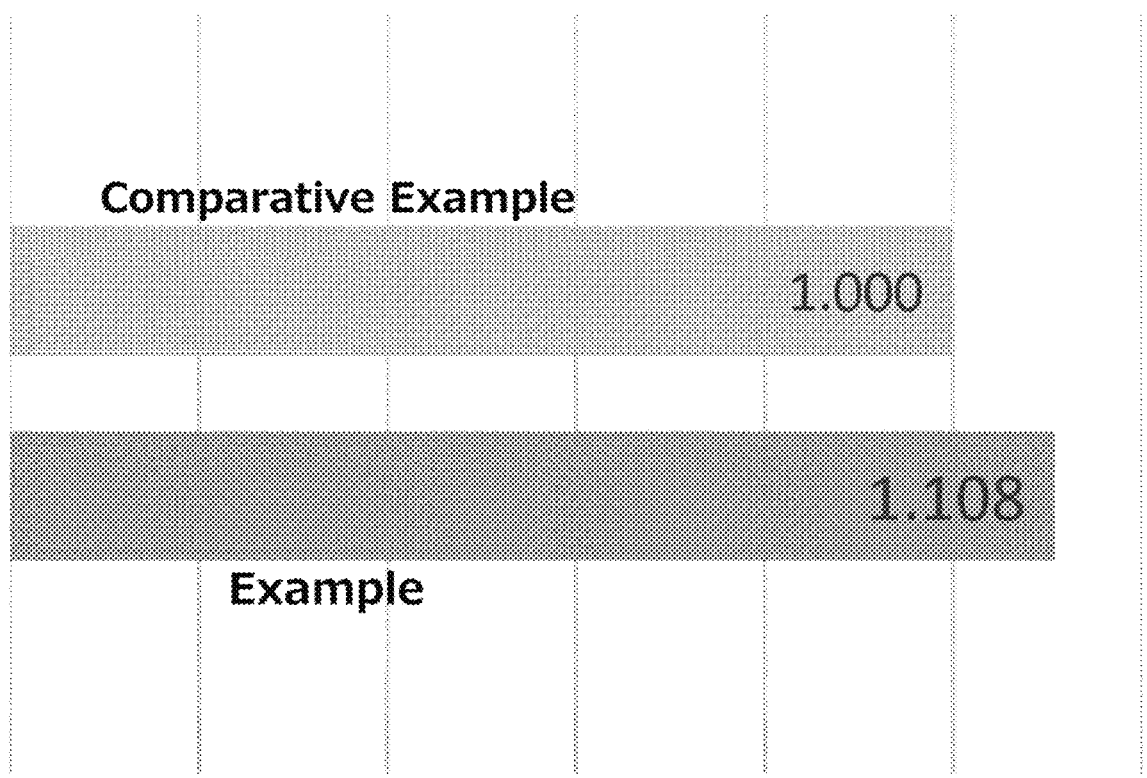
FIG. 3 is a graph showing the amount of luminosity as perceived as brightness by a person with protanopia (comparative example and embodiment)
Figure 4:
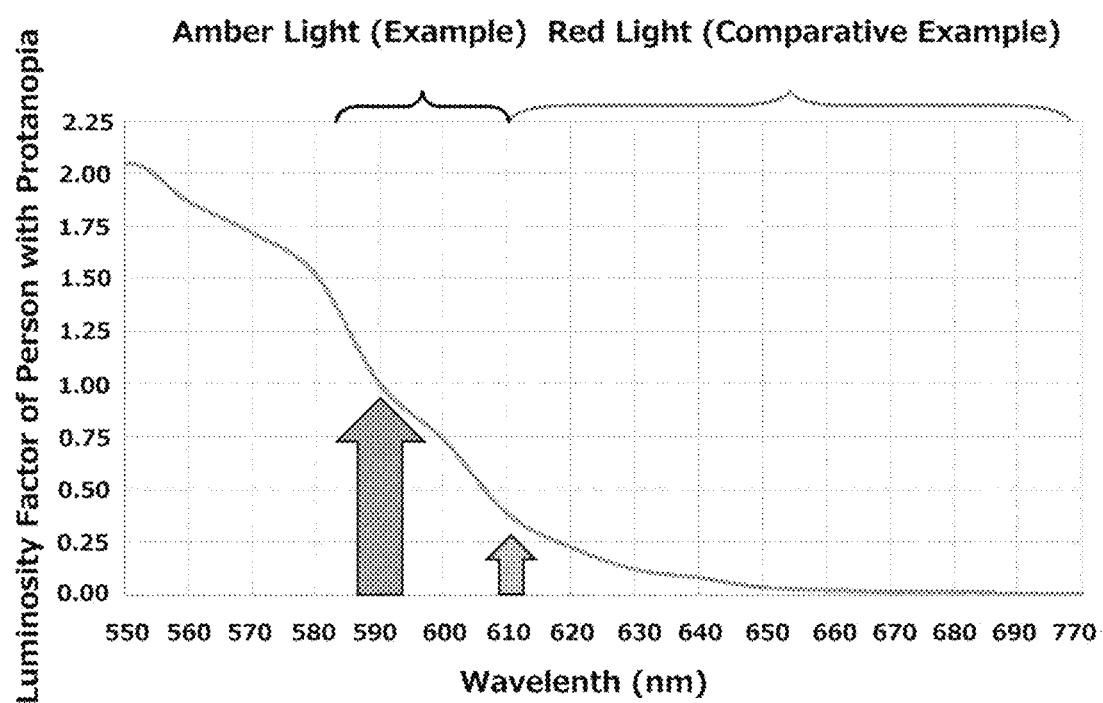
FIG. 4 is a graph showing the luminosity factor of a person with protanopia.

FIG. 3 is a graph showing the amount of luminosity as perceived as brightness by a person with protanopia, and FIG. 4 is a graph showing the luminosity factor of a person with protanopia.

A vehicle signal light of Comparative Example illustrated in FIG. 3 has the same configuration as that of the vehicle signal light 10 except that the second light source 20B is omitted from the vehicle signal light 10.

A brightness perceived by a person with respect to the total amount of light emitted from a certain light source is expressed by the following formula 7 using the concept of photometric amount. In the formula, Km is the maximum spectral luminous efficiency and V(λ) is the standard spectral luminous efficiency.

$$\Phi=Km\int S(\lambda)V(\lambda)d\lambda \quad \text{Formula 7}$$

Here, Km and V(λ) represent sensitivities of a standard person, that is, sensitivities of a person with normal color vision. However, this can be converted without issue to sensitivities Vp(λ) of a person with protanopia who has difficulty in seeing red. Furthermore, when considering which of the two light sources is brighter, for example, if the light flux of the light source spectrum S1(λ) is φ1 and the light flux of the light source spectrum S2(λ) is φ2, the brightness comparison φ1/φ2 can be expressed by the following formula 8. Therefore, when considering which light source is brighter for a person with protanopia, it can be described by the spectra S1(λ) and S2(λ) of the respective light sources and Vp(λ) of a person with protanopia.

$$\frac{\Phi_1}{\Phi_2}=\frac{\int S_1(\lambda)V_p(\lambda)d\lambda}{\int S_2(\lambda)V_p(\lambda)d\lambda} \quad \text{Formula 8}$$

Figure 5:
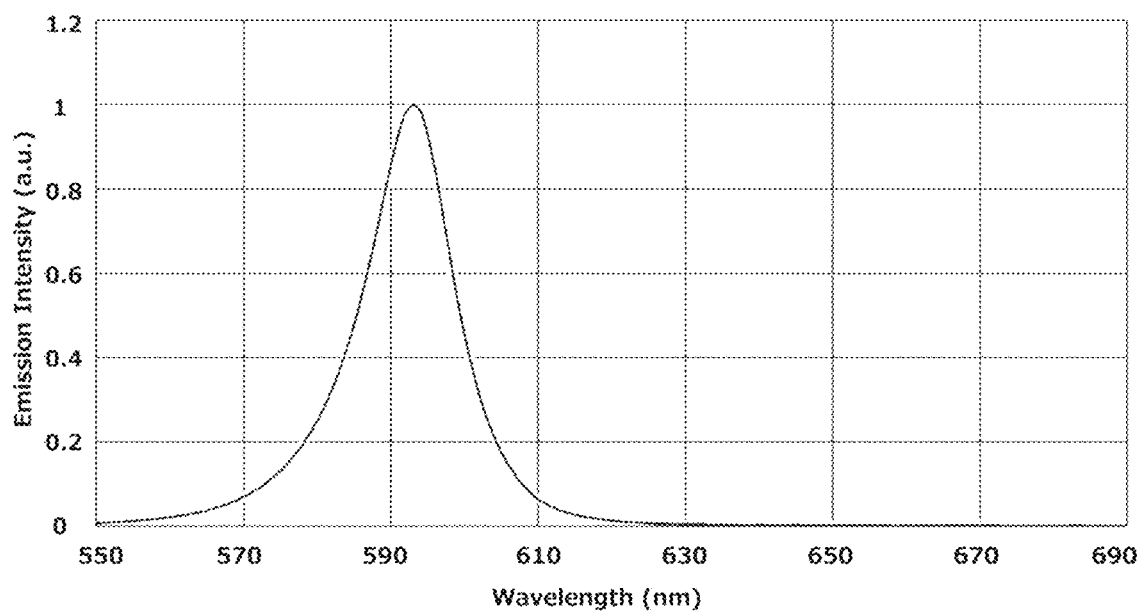
FIG. 5 is a graph showing an example of the emission spectrum of an amber light source.
Figure 6:
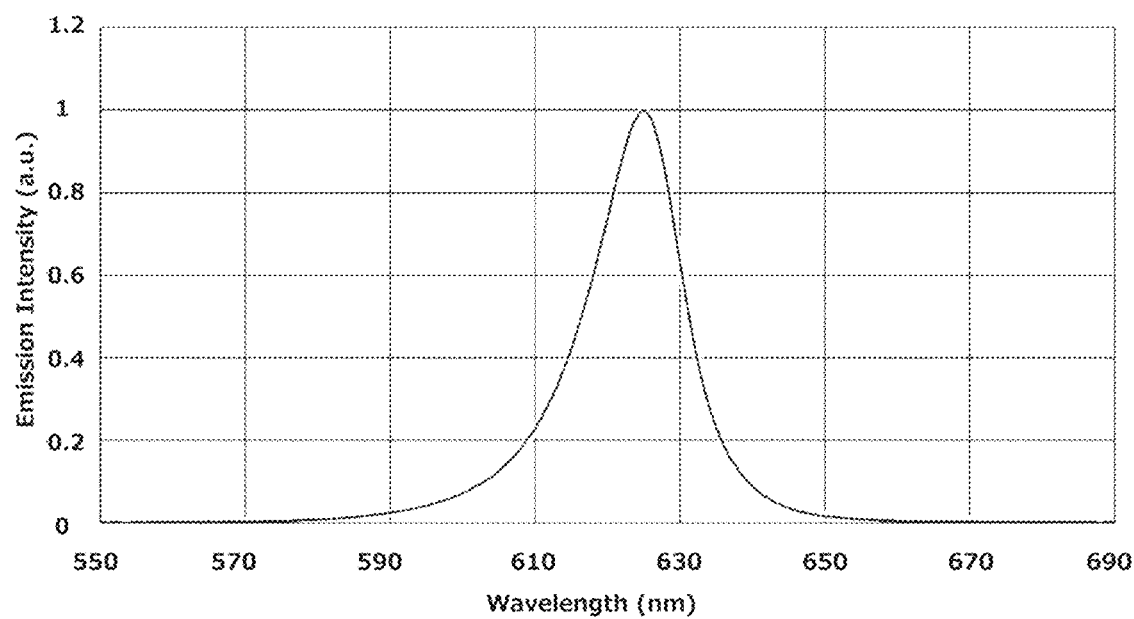
FIG. 6 is a graph showing an example of emission spectrum of an amber red light source.
Figure 7:
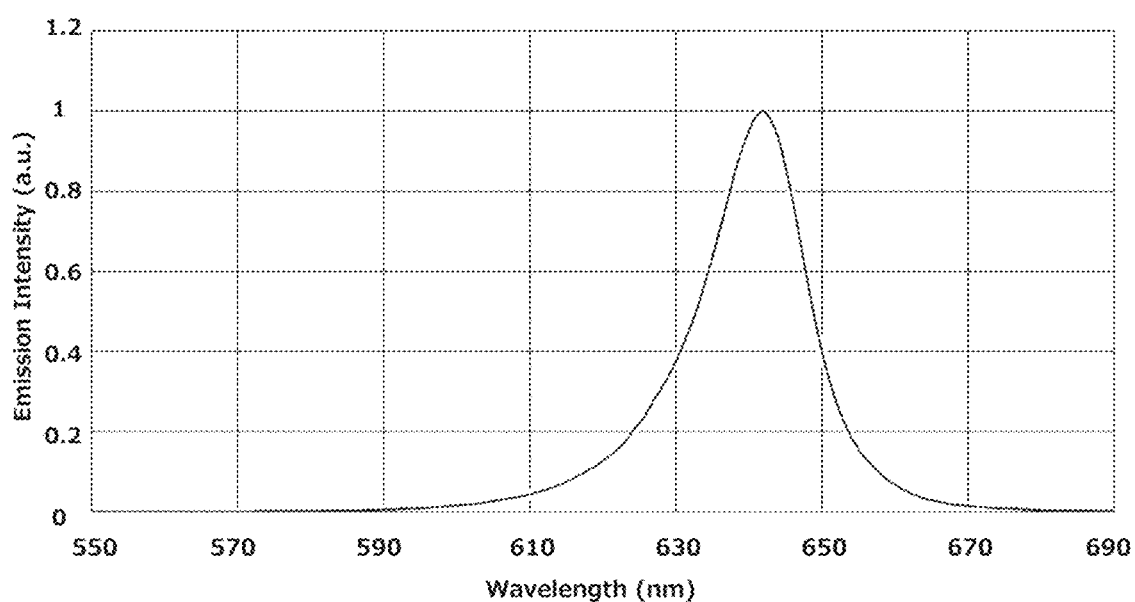
FIG. 7 is a graph showing an example of emission spectrum of a crimson (or cardinal red) light source.

Here, the spectrum of FIG. 5 is referred to as $S_{Am}(\lambda)$, the spectrum of FIG. 6 is referred to as $S_{AR}(\lambda)$, and the spectrum of FIG. 7 is referred to as $S_{SR}(\lambda)$. FIG. 5 is a graph showing an example of the emission spectrum of an amber light source, FIG. 6 is a graph showing an example of the emission spectrum of an amber red light source, and FIG. 7 is a graph showing an example of the emission spectrum of a crimson (or cardinal red) light source.

The spectrum when the first light source 20A configured to emit red light with a first wavelength band (620 nm or longer) and the second light source 20B configured to emit red light (amber light) with a second wavelength band (wavelength shorter than 620 nm) are simultaneously turned on is referred to as $S_2(\lambda)$. Here, $S_2(\lambda)$ is obtained by the following formula 9.

$$S_2(\lambda)=S_{SR}(\lambda)+S_{AR}(\lambda) \quad \text{Formula 9}$$

On the other hand, in the present embodiment, the spectrum obtained when the first light source 20A and the second light source 20B are simultaneously turned on so that the ratio of red light to amber light becomes the above-described ratio (for example, red:amber=100:2.7 to 4.0) is referred to as $S_1(\lambda)$.

Here, $S_1(\lambda)$ is obtained by the following formula 10.

$$S_1(\lambda)=S_{SR}(\lambda)+S_{Am}(\lambda) \quad \text{Formula 10}$$

When the brightness perceived by a person with protanopia is calculated for the comparative example and for the present embodiment using the above-mentioned formulas 8, 9, and 10, the brightness perceived by a person with protanopia is 1.000 for the comparative example, whereas the brightness perceived by a person with protanopia is 1.108 for the present embodiment. Thus, the brightness perceived by a person with protanopia in the present embodiment is improved by 10.8% compared to that in the comparative example.

This is because, as illustrated in FIG. 4, the luminosity factor of a person with protanopia in regards to amber light is higher than the luminosity factor of a person with protanopia in regards to red light.

In the vehicle signal light 10 with the above-described configuration, when the vehicle signal light 10 is used as a tail lamp, the first light source 20A and the second light source 20B are simultaneously turned on (continuously turned on) so that the ratio of the red light to the amber light becomes the above-mentioned ratio (for example, red:amber=100:2.7 to 4.0).

As illustrated in FIG. 1, the red light $Ray_{20A}$ emitted by the first light source 20A and the amber light $Ray_{20B}$ emitted by the second light source 20B enter the light guide plate 30 from the light incident surface 31, and are guided to within the light guide plate 30. The red light $Ray_{20A}$ and the amber light $Ray_{20B}$ are diffused and reflected by the second principal surface 30b including the plurality of optical elements, and exit through the first principal surface 30a as light obtained through mixing of the red light and the amber light.

The light obtained through mixing of the red light and the amber light passes through the outer lens 40 and is projected toward the back. At this time, the outer lens 40 projects the light that has been obtained through mixing of the red light and the amber light and has been transmitted through the outer lens 40. Thus, a tail lamp is realized.

At that time, since the amber light, of which the luminosity factor of a person with protanopia is high (higher than that of red light), is mixed, the brightness is improved by 10.8% as compared with a case in which the amber light is not mixed (see FIG. 3). As a result, a person with protanopia can perceive that the vehicle signal light (tail lamp) is turned on.

Furthermore, since the ratio of the red light to the amber light is adjusted (set) so that the chromaticity range of the light obtained through mixing of the red light and the amber light is defined as x>0.71 and y<0.289, a person with normal color vision can perceive red color. In particular, since the first light source 20A emits red light with a wavelength of 620 nm or longer, a person with normal color vision can perceive red color as a dark red color.

Furthermore, in the vehicle signal light 10 with the above-described configuration, when the vehicle signal light 10 is used as a stop lamp, the first light source 20A and the second light source 20B are simultaneously turned on to emit light so that the ratio of the red light to the amber light matches the above-mentioned ratio (for example, red:amber=100:2.7 to 4.0) and the light is emitted with a higher luminous intensity in response to a braking operation. Here, the "braking operation" means an operation for operating the braking mechanism 200 for a vehicle body to decelerate the speed of a vehicle body. Thus, the braking mechanism 200 is configured to deliver an electrical instruction for controlling the vehicle signal light 10 in addition to the function of braking operation. When the braking mechanism 200 is operated, the electrical instruction can be issued in accordance with the braking operation to activate the light source 20. The control can be achieved by a common method/mechanism in this technical field, so description thereof will be omitted here.

As illustrated in FIG. 1, the first light source 20A emits the red light $Ray_{20A}$ and the second light source 20B emits the amber light $Ray_{20B}$ as mixed light with a higher luminous intensity. Then, the red light $Ray_{20A}$ and the amber light $Ray_{20B}$ enter the light guide plate 30 through the light incident surface 31, and are guided to within the light guide plate 30. The guided red light $Ray_{20A}$ and the amber light $Ray_{20B}$ are diffused and reflected by the second principal surface 30b with a plurality of optical elements, and exit through the first principal surface 30a as light obtained through mixing of the red light and the amber light. The light obtained through mixing of the red light and the amber light is transmitted through the outer lens 40 so as to be projected toward the back. At this time, the outer lens 40 emits mixed light of the red light and the amber light having been transmitted through the outer lens 40. As a result, a stop lamp is realized.

At that time, since the higher intensity amber light, of which the luminosity factor of a person with protanopia is high (higher than that of red light), is mixed, the brightness is improved by 10.8% as compared with a case in which the amber light is not mixed (see FIG. 3). As a result, a person with protanopia can perceive that the vehicle signal light (stop lamp) is turned on.

Furthermore, since the ratio of the red light to the amber light is adjusted (set) so that the chromaticity range of the light obtained through mixing of the red light and the amber light is defined as x>0.71 and y<0.289, a person with normal color vision can perceive red color. In particular, since the first light source 20A emits red light with a wavelength of 620 nm or longer, a person with normal color vision can perceive red color as a dark red color.

As described above, according to the present embodiment, a person with protanopia can perceive whether or not the vehicle signal light (for example, a stop lamp, a tail lamp, and the like) is turned on.

This is because provided is the second light source 20B which is configured to emit amber light, of which the luminosity factor of a person with protanopia is high (higher than that of red light).

Furthermore, according to the present embodiment, s possible to provide a vehicular lamp in which a person with normal color vision can perceive red color and a person with protanopia can perceive whether or not the vehicle signal light, e.g., a stop lamp, a tail lamp, or the like is turned on.

Adjustment (setting) of the ratio of the red light to the amber light after transmission through the outer lens 40 so that the chromaticity range of the light obtained through mixing of the red light and the amber light is defined as x>0.71 and y<0.289 can allow a person with normal color vision to perceive red color.

This is because the provision of the second light source 20B which is configured to emit amber light, of which the luminosity factor of a person with protanopia is high (higher than that of red light), can allow a person with protanopia to perceive whether or not the vehicle signal light 10, e.g., a stop lamp, a tail lamp, or the like is turned on.

According to the present embodiment, the vehicle signal light 10 can satisfy the standards (chromaticity range) of stop and tail lamps in North America and Europe.

Furthermore, according to the present embodiment, it is possible to contribute to cost reduction because it is possible to minimize the numbers of the first light source 20A configured to emit red light and the second light source 20B configured to emit amber light. In addition, since the mixing ratio of the red light to the amber light can be easily adjusted, it is possible to provide stop and tail lamps which emit, upon the same surface, light that can be visually perceived by a person with protanopia who has difficulties in perceiving red light, particularly deep red light.

This is because the ratio of the red light to the amber light after transmission through the outer lens 40 is adjusted (set) so that the chromaticity range of the light obtained through mixing of the red light and the amber light is defined as x>0.71 and y<0.289.

Next, modified examples will be described.

Modified Example 1

In the above-described embodiment, LEDs are adopted as the first light source 20A and the second light source 20B, but the presently disclosed subject matter is not limited thereto. For example, as the first light source 20A, a first organic EL element (organic EL panel; hereinafter, also referred to as a first organic EL element 20A) configured to emit red light may be adopted. As the second light source 20B, a second organic EL element (organic EL panel; hereinafter, also referred to as a second organic EL element 20B) configured to emit amber light may be adopted.

Figure 8A:
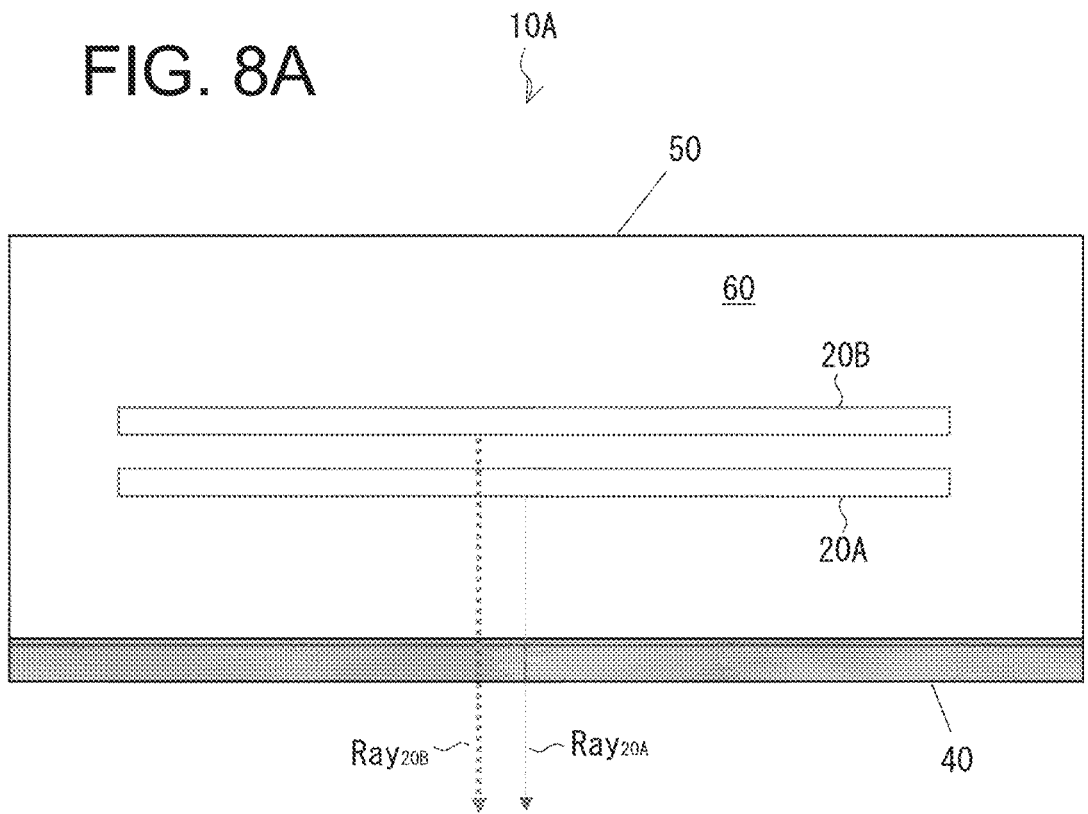
FIG. 8A is a top view of a vehicle signal light 10A using a first organic EL element 20A and a second organic EL element 20B as the light source 20 (modified example)
Figure 8B:
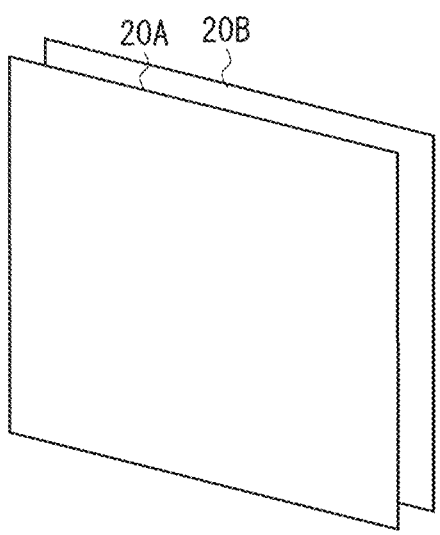
FIG. 8B is a perspective view of the first organic EL element 20A and the second organic EL element 20B extracted from FIG. 8A.

FIG. 8A is a top view of a vehicle signal light 10A using the first organic EL element 20A and the second organic EL element 20B (modified example), and FIG. 8B is a perspective view of the first organic EL element 20A and the second organic EL element 20B extracted from FIG. 8A. The definition of X, Y, and Z directions are the same as that in FIG. 1 and the indication of such directions are omitted in FIGS. 8A and 8B and the successive drawings illustrating modified examples.

The first organic EL element 20A and the second organic EL element 20B are, for example, rectangular (see FIG. 8B), but may take any outer shape. As shown in FIGS. 8A and 8B, the first organic EL element 20A and the second organic EL element 20B are disposed to overlap each other when viewed in the X direction. In FIG. 8A, the first organic EL element 20A and the second organic EL element 20B are disposed in this order toward the light-irradiation direction, but may be disposed in the reverse order.

When the first organic EL element 20A and the second organic EL element 20B are simultaneously turned on, the amber light $Ray_{20B}$ emitted by second organic EL element 20B, which is disposed behind the first organic EL element 20A, transmits through the first organic EL element 20A (see FIG. 8A). The red light $Ray_{20A}$ emitted by the first organic EL element 20A and the amber light $Ray_{20B}$ transmitted through the first organic EL element 20A are transmitted through the outer lens 40 and projected toward the back as mixed light. At this time, the outer lens 40 emits light obtained through mixing of the red light $Ray_{20A}$ and the amber light $Ray_{20B}$ and being transmitted through the outer lens 40.

Note that, also in the present modified example, the ratio of the integrated intensity of the red light to that of the amber light after transmission through the outer lens 40 (hereinafter, simply referred to as the ratio of the red light to the amber light) is adjusted (set) so that the chromaticity range of the light obtained through mixing of the red light and the amber light is defined as x>0.71 and y<0.289 so that a person with normal color vision can perceive red color as the color.

According to the present modified example, the same effects as those of the above-described embodiment can be achieved.

Modified Example 2

In addition, for example, a first film light source 20A configured to emit red light (hereinafter also referred to as a first film light source 20A) may be adopted as the first light source 20A, and a second film light source configured to emit amber light (hereinafter also referred to as a second film light source) may be adopted as the second light source 20B.

Figure 9A:
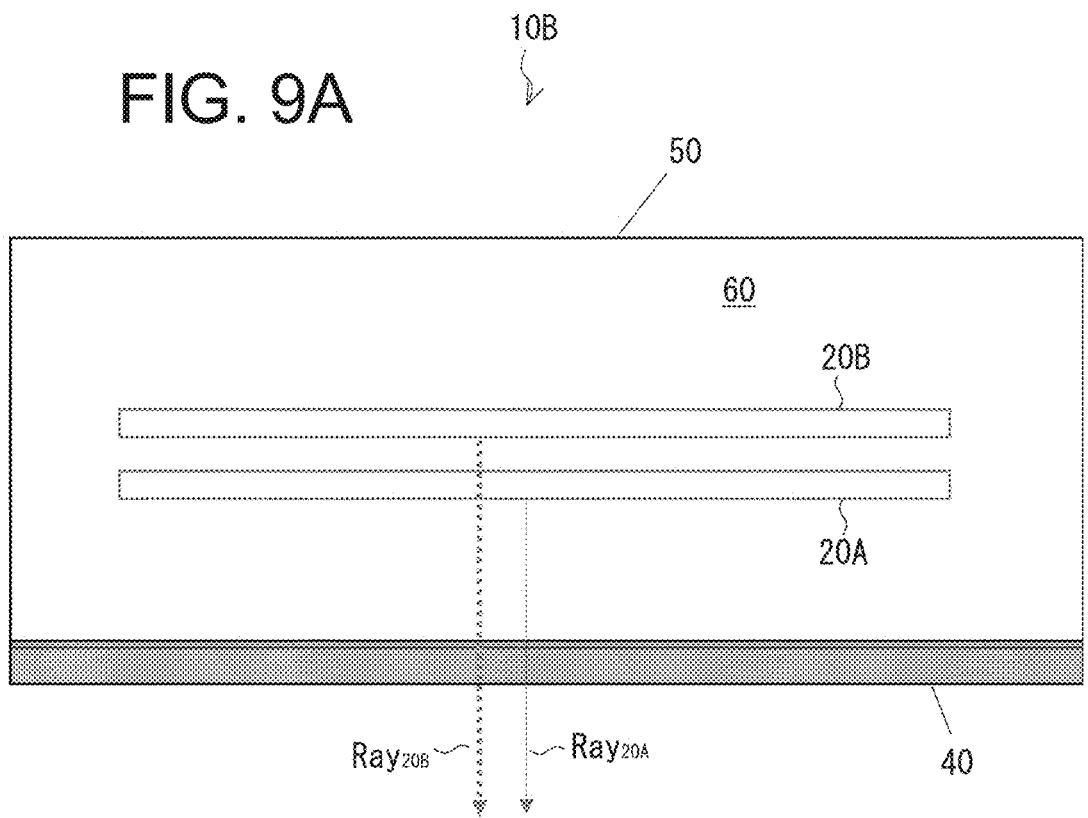
FIG. 9A is a top view of a vehicle signal light 10B using a first film light source 20A and a second film light source 20B as the light source 20 (modified example)
Figure 9B:
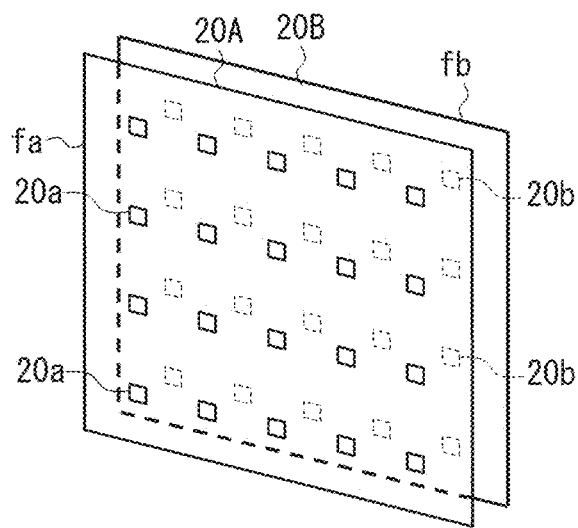
FIG. 9B is a perspective view of the first film light source 20A and the second film light source 20B, extracted from FIG. 9A.

FIG. 9A is a top view of a vehicle signal light 10B using a first film light source 20A and a second film light source 20B (modified example), and FIG. 9B is a perspective view of the first film light source 20A and the second film light source 20B extracted from FIG. 9A.

As illustrated in FIG. 9B, the first film light source 20A is a film-like light source which includes a transparent film fa with flexibility and a plurality of semiconductor light emitting elements 20a (LEDs), which emit red light, that are fixed in a state of being two-dimensionally disposed on at least a surface of the transparent film fa. Similarly, the second film light source 20B is a film-like light source which includes a transparent film fb with flexibility and a plurality of semiconductor light emitting elements 20b (LEDs), which emit amber-colored light, that are fixed in a state of being two-dimensionally disposed on at least a surface of the transparent film fb. Examples of such film light sources include those described in, for example, Japanese Patent Application Laid-Open No. 2020-042917, which is hereby incorporated in its entirety by reference.

The first film light source 20A and the second film light source 20B are, for example, rectangular (see FIG. 9B), but may take any outer shape. As shown in FIGS. 9A and 9B, the first film light source 20A and the second film light source 20B are disposed to overlap each other when viewed in the X direction. In FIG. 9A, the first film light source 20A and the second film light source 20B are disposed in this order toward the light-irradiation direction, but may be disposed in the reverse order.

When the first film light source 20A and the second film light source 20B are simultaneously turned on, the amber light $Ray_{20B}$ emitted by the second film light source 20B, which is disposed behind the first film light source 20A, transmits the first film light source 20A (see FIG. 9A). The red light $Ray_{20A}$ emitted by the first film light source 20A and the amberlight $Ray_{20B}$ transmitted through the first film light source 20A are transmitted through the outer lens 40 and projected toward the back as mixed light. At this time, the outer lens 40 emits light obtained through mixing of the red light $Ray_{20A}$ and the amber light $Ray_{20B}$ and being transmitted through the outer lens 40.

Note that, also in the present modified example, the ratio of the integrated intensity of the red light to that of the amber light after transmission through the outer lens 40 (hereinafter, simply referred to as the ratio of the red light to the amber light) is adjusted (set) so that the chromaticity range of the light obtained through mixing of the red light and the amber light is defined as x>0.71 and y<0.289 so that a person with normal color vision can perceive red color as the color.

According to the present modified example, the same effects as those of the above-described embodiment can be achieved.

In the above-described embodiment, the light guide plate is used as the optical component 30 as an example, but the presently disclosed subject matter is not limited thereto.

Specifically, the optical component 30 may take any configuration so long as such an optical component can control the red light emitted by the first light source 20A and the amber light emitted by the second light source 20B so that the light obtained through mixing of the red light emitted by the first light source 20A and the amber light emitted by the second light source 20B can transmit through the outer lens 40. Although not illustrated, examples thereof include a light guide rod, a reflector, a convex lens, and a concave lens.

Modified Example 3

Figure 10A:
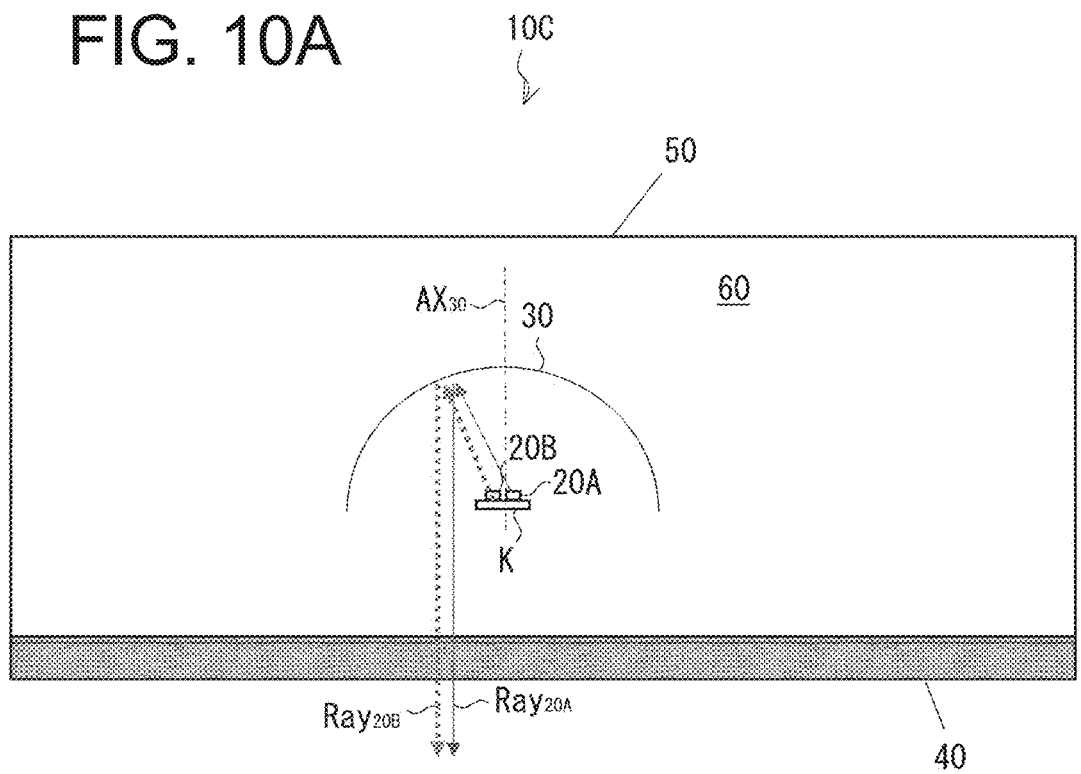
FIG. 10A is a top view of a vehicle signal 10C using a reflector as the optical component 30 (hereinafter, also referred to as a reflector 30)(modified example)

FIG. 10A is a top view of a vehicle signal light 10C (modified example) using a reflector (hereinafter, also referred to as a reflector 30) as the optical component 30.

The reflector 30 includes, for example, a parabolic reflective surface, such as a multi-reflector. The reflector 30 has an optical axis $AX_{30}$ that extends in the X direction. The first light source 20A and the second light source 20B are mounted on a substrate K to be adjacent to each other and be disposed at or near the focal point of the reflector 30 (the focal point of the parabolic reflective surface).

When the first light source 20A and the second light source 20B are simultaneously turned on, the red light $Ray_{20A}$ emitted by the first light source 20A and the amber light $Ray_{20B}$ emitted by the second light source 20B are reflected by the reflector 30 (parabolic reflective surface). The red light $Ray_{20A}$ emitted by the first light source 20A and the amber light $Ray_{20B}$ emitted by the second light source 20B are transmitted through the outer lens 40 and projected toward the back as mixed light. At this time, the outer lens 40 emits light obtained through mixing of the red light $Ray_{20A}$ and the amber light $Ray_{20B}$ and being transmitted through the outer lens 40.

Note that, also in the present modified example, the ratio of the integrated intensity of the red light to that of the amber light after transmission through the outer lens 40 (hereinafter, simply referred to as the ratio of the red light to the amber light) is adjusted (set) so that the chromaticity range of the light obtained through mixing of the red light and the amber light is defined as x>0.71 and y<0.289 so that a person with normal color vision can perceive red color as the color.

According to the present modified example, the same effects as those of the above-described embodiment can be achieved.

Modified Example 4

Figure 10B:
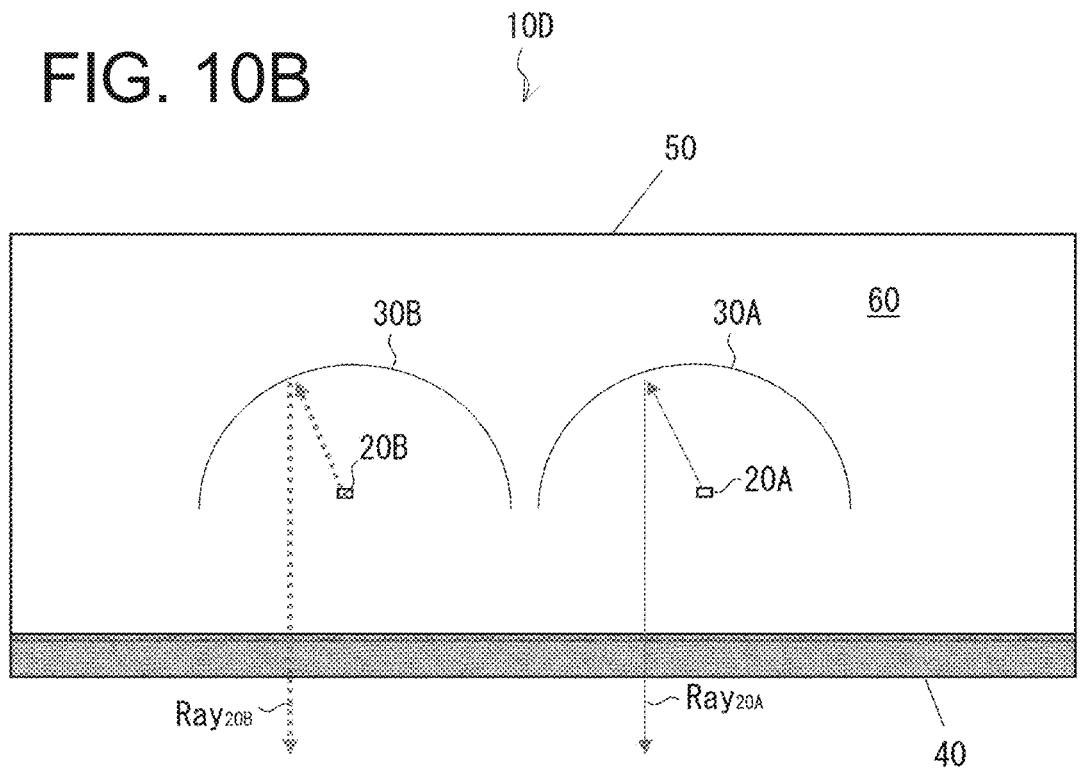
FIG. 10B is a top view of a vehicle signal light 10D using two reflectors as the optical component 30 (hereinafter, also referred to as a first reflector 30A and as a second reflector 30B) (modified example).

FIG. 10B is a top view of a vehicle signal light 10D (modified example) using two reflectors, or a first reflector 30A and a second reflector 30B, as the optical component 30.

The first reflector 30A and the second reflector 30B each include, for example, a parabolic reflective surface, such as a multi-reflector. The first light source 20A is disposed at or near the focal point of the first reflector 30A (the focal point of the parabolic reflective surface). The second light source 20B is disposed at or near the focal point of the second reflector 30B (the focal point of the parabolic reflective surface).

The first reflector 30A has an optical axis that extends in the X direction although not illustrated. On the other hand, the second reflector 30B has an optical axis which, although not illustrated, extends in a direction inclined with respect to the X direction so that the amber light $Ray_{20B}$ reflected by the second reflector 30B overlaps the red light $Ray_{20A}$ reflected by the first reflector 30A in a predetermined area on a virtual screen which is assumed to be disposed at a predetermined distance away from the vehicle signal light 10D). On the other hand, this case is configured in a contrasting situation, i.e., the optical axis of the second reflector 30B may extend in the X-direction while the optical axis of the first reflector 30A may extend in a direction inclined with respect to the X direction so that the red light $Ray_{20A}$ reflected by the first reflector 30A overlaps the amber light $Ray_{20B}$ reflected by the second reflector 30B in a predetermined area on the virtual screen.

When the first light source 20A and the second light source 20B are simultaneously turned on, the red light $Ray_{20A}$ emitted by the first source 20A and the amber light $Ray_{20B}$ emitted by the second light source 20B are reflected by the first reflector 30A and the second reflector 30B, respectively. The red light $Ray_{20A}$ emitted by the first light source 20A and the amber light $Ray_{20B}$ emitted by the second light source 20B are transmitted through the outer lens 40 and projected to the back so as to illuminate the predetermined area with mixed light. At this time, the outer lens 40 emits the red light $Ray_{20A}$ and the amber light $Ray_{20B}$ so that red light $Ray_{20A}$ and the amber light $Ray_{20B}$ are mixed to illuminate the predetermined area after transmission through the outer lens 40.

Note that, also in the present modified example, the ratio of the integrated intensity of the red light to that of the amber light after transmission through the outer lens 40 (hereinafter, simply referred to as the ratio of the red light to the amber light) is adjusted (set) so that the chromaticity range of the light obtained through mixing of the red light and the amber light is defined as x>0.71 and y<0.289 so that a person with normal color vision can perceive red color as the color.

According to the present modified example, the same effects as those of the above-described embodiment can be achieved.

Modified Example 5

Figure 11A:
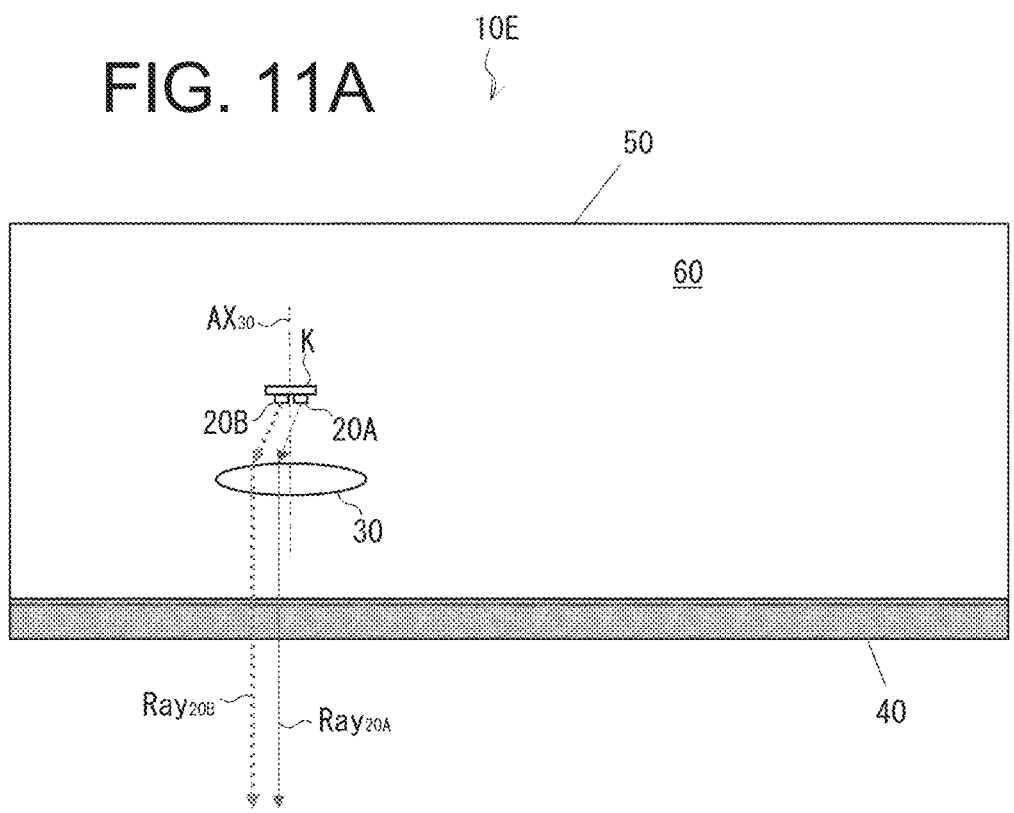
FIG. 11A is a top view of a vehicle signal light 10E using a convex lens as the optical component 30 (hereinafter, also referred to as a convex lens 30)(modified example)

FIG. 11A is a top view of a vehicle signal light 10E (modified example) using a convex lens (hereinafter, also referred to as a convex lens 30) as the optical component 30.

The convex lens 30 has an optical axis $AX_{30}$ that extends in the X direction. The first light source 20A and the second light source 20B are mounted on a substrate K to be adjacent to each other and be disposed at or near the focal point of the convex lens 30.

When the first light source 20A and the second light source 20B are simultaneously turned on, the red light $Ray_{20A}$ emitted by the first light source 20A and the amber light $Ray_{20B}$ emitted by the second light source 20B are transmitted through the convex lens 30. The red light $Ray_{20A}$ emitted by the first light source 20A and the amber light $Ray_{20B}$ emitted by the second light source 20B are transmitted through the outer lens 40 and projected to the back as mixed light. At this time, the outer lens 40 emits light obtained through mixing of the red light $Ray_{20A}$ and the amber light $Ray_{20B}$ and transmitting through the outer lens 40.

Note that, also in the present modified example, the ratio of the integrated intensity of the red light to that of the amber light after transmission through the outer lens 40 (hereinafter, simply referred to as the ratio of the red light to the amber light) is adjusted (set) so that the chromaticity range of the light obtained through mixing of the red light and the amber light is defined as x>0.71 and y<0.289 so that a person with normal color vision can perceive red color as the color.

Note that the lens may not be limited to a convex lens, but may be a concave lens or another type of lens according to required specification.

According to the present modified example, the same effect as that of the above-described embodiment can be achieved.

Modified Example 6

Figure 11B:
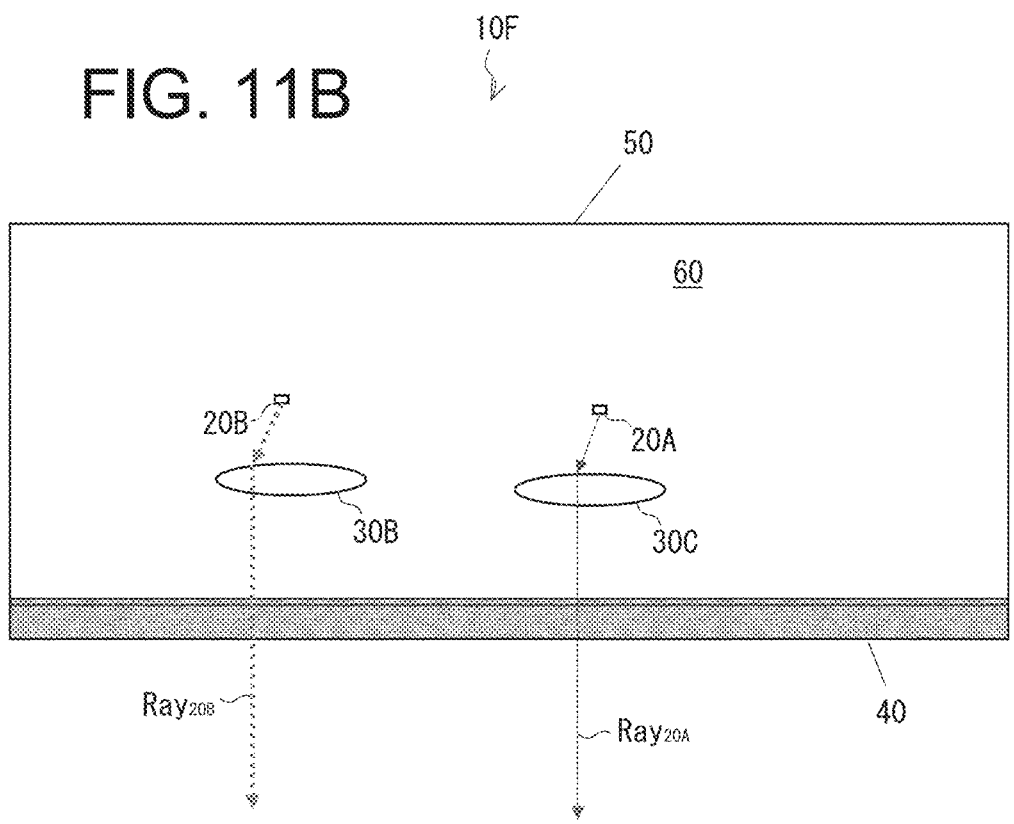
FIG. 11B is a top view of a vehicle signal light 10F using two convex lenses as the optical component 30 (hereinafter, also referred to as a first convex lens 30A and as a second convex lens 30B)(modified example).

FIG. 11B is a top view of a vehicle signal light 10F (modified example) using two convex lenses as the optical component 30 (hereinafter, also referred to as a first convex lens 30A and a second convex lens 30B). The first light source 20A is disposed at or near the focal point of the first convex lens 30A. The second light source 20B is disposed at or near the focal point of the second convex lens 30B.

The first convex lens 30A has an optical axis that extends in the X direction although not illustrated. On the other hand, the second reflector 30B has an optical axis which, although not illustrated, extends in a direction inclined with respect to the X direction so that the amber light $Ray_{20B}$ transmitting through the second convex lens 30B overlaps with the red color light $Ray_{20A}$ transmitting through the first convex lens 30A in a predetermined area on a virtual screen which is assumed to be disposed at a predetermined distance away from the vehicle signal light 10F). On the other hand, this case is configured in a contrasting situation, i.e., the optical axis of the second convex lens 30B may extend in the X-direction while the optical axis (not illustrated) of the first convex lens 30A may extend in a direction inclined with respect to the X direction so that the red light Ray$_{20A}$ transmitting through the first convex lens 30A overlaps the amber light Ray$_{20B}$ transmitting through the second convex lens 30B in a predetermined area on the virtual screen.

When the first light source 20A and the second light source 20B are simultaneously turned on, the red light Ray$_{20A}$ emitted by the first light source 20A and the amber light Ray$_{20B}$ emitted by the second light source 20B are transmitted through the first convex lens 30A and the second convex lens 30B, respectively. The red light Ray$_{20A}$ emitted by the first light source 20A and the amber light Ray$_{20B}$ emitted by the second light source 20B are transmitted through the outer lens 40 and projected to the back so as to illuminate the predetermined area with mixed light. At this time, the outer lens 40 emits the red light Ray$_{20A}$ and the amber light Ray$_{20B}$ so that red light Ray$_{20A}$ and the amber light Ray$_{20B}$ are mixed to illuminate the predetermined area after transmission through the outer lens 40.

Note that, also in the present modified example, the ratio of the integrated intensity of the red light to that of the amber light after transmission through the outer lens 40 (hereinafter, simply referred to as the ratio of the red light to the amber light) is adjusted (set) so that the chromaticity range of the light obtained through mixing of the red light and the amber light is defined as x>0.71 and y<0.289 so that a person with normal color vision can perceive red color as the color.

Note that the lens may not be limited to a convex lens, but may be a concave lens or another type of lens according to required specification.

According to the present modified example, the same effect as that of the above-described embodiment can be achieved.

In the above-described embodiment, the vehicle signal light according to the presently disclosed subject matter has been described by way of example in which the presently disclosed subject matter is applied to a vehicle signal light that functions as a stop lamp and a tail lamp. However, the presently disclosed subject matter is not limited thereto. Exemplary lighting fixtures to which the presently disclosed subject matter can be applied include warning lights, traffic signal lights, highway sign lights, lights for decorative illumination, projected clocks, electric bulletin boards.

All of the numerical values shown in the above-described embodiments are exemplified, and it is needless to say that an appropriate numerical value different from this can be used.

It will be apparent to those skilled in the art that various modified examples and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle signal light comprising:
a first light source configured to emit red light with a wavelength of 620 nm or longer;
a second light source configured to emit amber light that does not include light with a wavelength of 620 nm or longer;
a light emitting unit configured to emit light via transmission of light obtained through mixing of the red light and the amber light; and
an optical component configured to control the red light and the amber light so that the light obtained through mixing of the red light and the amber light is transmitted through the light emitting unit; wherein
the first light source and the second light source are simultaneously turned on and are configured to emit light with a higher luminous intensity in response to a braking operation,
an emission intensity of the first light source is higher than that of the second light source,
a ratio of integrated intensity of the red light to that of the amber light after transmission through the light emitting unit is adjusted so that a chromaticity range of the light obtained through mixing of the red light and the amber light is defined as x>0.71 and y<0.289 in an xy chromaticity coordinate of CIE color space, and
the ratio of the integrated intensity after transmission through the light emitting unit is red:amber=100:2.7 to 4.0.

2. The vehicle signal light according to claim 1, wherein the amber light includes light with a peak wavelength of 600 nm or shorter.

3. The vehicle signal light according to claim 1, wherein at least one of the first light source and the second light source is one selected from a light-emitting diode and an organic electroluminescent element.

4. The vehicle signal light according to claim 2, wherein at least one of the first light source and the second light source is one selected from a light-emitting diode and an organic electroluminescent element.

5. The vehicle signal light according to claim 1, wherein the optical component is one selected from a light guide rod, a light guide plate, a reflector, and a convex lens.

6. The vehicle signal light according to claim 2, wherein the optical component is one selected from a light guide rod, a light guide plate, a reflector, and a convex lens.

7. The vehicle signal light according to claim 3, wherein the optical component is one selected from a light guide rod, a light guide plate, a reflector, and a convex lens.

8. A vehicle comprising:
a vehicle signal light including
a first light source configured to emit red light with a wavelength of 620 nm or longer,
a second light source configured to emit amber light that does not include light with a wavelength of 620 nm or longer,
a light emitting unit configured to emit light via transmission of light obtained through mixing of the red light and the amber light; and
an optical component configured to control the red light and the amber light so that the light obtained through mixing of the red light and the amber light is transmitted through the light emitting unit; and
a braking mechanism configured to perform a braking operation for achieving a braking effect, wherein
the first light source and the second light source are simultaneously turned on and are configured to emit light with a higher luminous intensity in response to the braking operation,
an emission intensity of the first light source is higher than that of the second light source,
a ratio of integrated intensity of the red light to that of the amber light after transmission through the light emitting unit is adjusted so that a chromaticity range of the light obtained through mixing of the red light and the amber light is defined as x>0.71 and y<0.289 in an xy chromaticity coordinate of CIE color space, and the ratio of the integrated intensity after transmission through the light emitting unit is red:amber=100:2.7 to 4.0.

9. The vehicle signal light according to claim 5, wherein:
the optical component is the light guide plate;
the light guide plate includes
   a first principal surface and a second principal surface which are opposite to each other, and
   an end face disposed beside the first and second principal surfaces, the end face being configured to receive light from the first light source and the second light source;
one of the first and second principal surfaces is directed toward a light irradiation direction; and
the other of the first and second principal surfaces includes a plurality of optical elements configured to diffuse and reflect light that enters the light guide plate through the end face from the first light source and the second light source so as to exit through the one of the first and second principal surfaces.

10. The vehicle signal light according to claim 6, wherein:
the optical component is the light guide plate;
the light guide plate includes
   a first principal surface and a second principal surface which are opposite to each other, and
   an end face disposed beside the first and second principal surfaces, the end face being configured to receive light from the first light source and the second light source;
one of the first and second principal surfaces is directed toward a light irradiation direction; and
the other of the first and second principal surfaces includes a plurality of optical elements configured to diffuse and reflect light that enters the light guide plate through the end face from the first light source and the second light source so as to exit through the one of the first and second principal surfaces.

11. The vehicle signal light according to claim 7, wherein:
the optical component is the light guide plate;
the light guide plate includes
   a first principal surface and a second principal surface which are opposite to each other, and
   an end face disposed beside the first and second principal surfaces, the end face being configured to receive light from the first light source and the second light source;
one of the first and second principal surfaces is directed toward a light irradiation direction; and
the other of the first and second principal surfaces includes a plurality of optical elements configured to diffuse and reflect light that enters the light guide plate through the end face from the first light source and the second light source so as to exit through the one of the first and second principal surfaces.

12. The vehicle signal light according to claim according to claim 5, wherein:
the optical component is the reflector;
the reflector has a parabolic reflective surface disposed to open in a light irradiation direction; and
the first light source and the second light source are mounted on a substrate to be adjacent to each other and are disposed at or near a focal point of the reflector while the first light source and the second light source are directed to the parabolic reflective surface.

13. The vehicle signal light according to claim according to claim 6, wherein:
the optical component is the reflector;
the reflector has a parabolic reflective surface disposed to open in a light irradiation direction; and
the first light source and the second light source are mounted on a substrate to be adjacent to each other and are disposed at or near a focal point of the reflector while the first light source and the second light source are directed to the parabolic reflective surface.

14. The vehicle signal light according to claim according to claim 7, wherein:
the optical component is the reflector;
the reflector has a parabolic reflective surface disposed to open in a light irradiation direction; and
the first light source and the second light source are mounted on a substrate to be adjacent to each other and are disposed at or near a focal point of the reflector while the first light source and the second light source are directed to the parabolic reflective surface.

* * * * *